United States Patent [19]

Pendergast

[11] 4,224,048
[45] Sep. 23, 1980

[54] OSMOTIC FERTILIZER PRODUCT AND FERTILIZATION METHOD

[75] Inventor: Edward B. Pendergast, Cresskill, N.J.

[73] Assignee: Products by Hector, Incorporated, Englewood Cliff, N.J.

[21] Appl. No.: 887,794

[22] Filed: Mar. 17, 1978

[51] Int. Cl.$^2$ ............................................. A01G 29/00
[52] U.S. Cl. ........................................ 71/11; 71/64 F; 71/27; 71/64 R; 47/485
[58] Field of Search .................... 47/48.5; 71/11, 64 F, 71/27, 64 R, 23, 64 A

[56] References Cited

U.S. PATENT DOCUMENTS

| | | | |
|---|---|---|---|
| 1,554,865 | 9/1925 | Magoon | 47/48.5 |
| 2,380,721 | 7/1945 | Brigden | 47/48.5 |
| 4,063,919 | 12/1977 | Grano | 71/27 |

FOREIGN PATENT DOCUMENTS 212721  8/1909  Fed. Rep. of Germany ............ 47/48.5

Primary Examiner—Barry S. Richman
Assistant Examiner—Chris Konkol
Attorney, Agent, or Firm—Charles R. Engle

[57] ABSTRACT

A fertilizer product and method for providing controlled application of high analysis fertilizer. A controlled initial light release of a water soluble plant food consistent with growth requirements of the plant is provided. As the plant increases in size and requires an increase of plant food the subject fertilizer and method supplies increasing amounts of plant food without fertilizer burning. The subject product and method includes a water expandable reverse osmosis membrane barrier, preferably in the form of a collar providing a source of plant food released in controlled varying amounts as required by plant growth.

6 Claims, 7 Drawing Figures

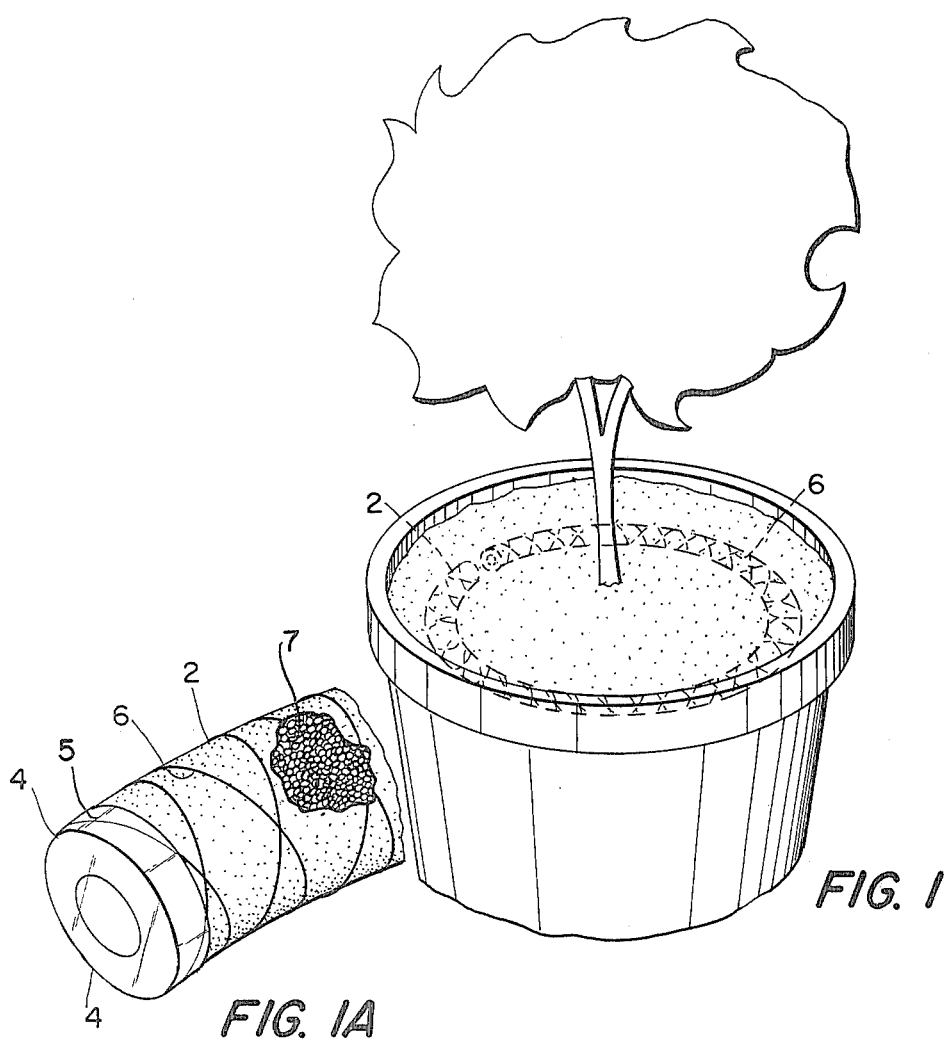
FIG. 1
FIG. 1A
FIG. 2
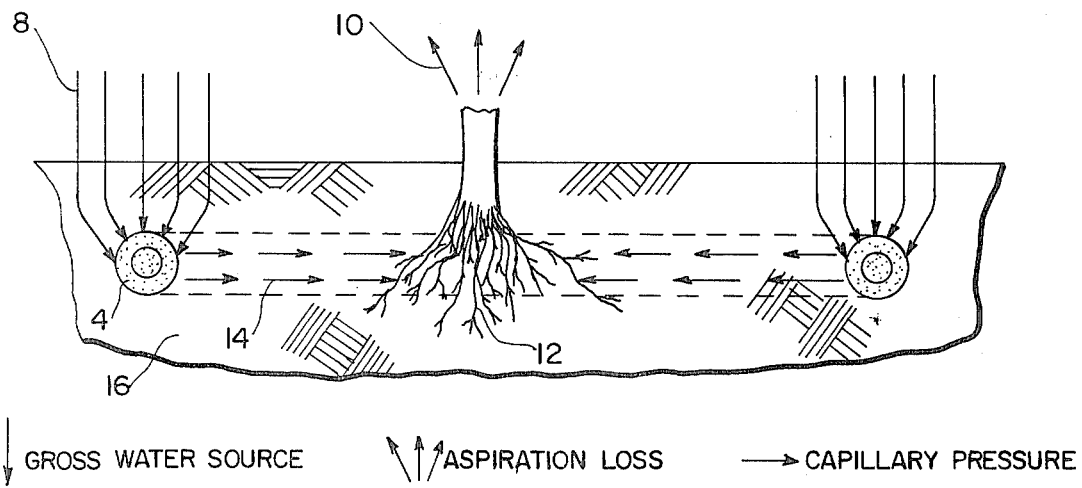
↓ GROSS WATER SOURCE     ↑↑ ASPIRATION LOSS     → CAPILLARY PRESSURE

RELATIVE GRAM WEIGHT TESTS OF PARALLEL GROWN TEST PLANTS

RELATIVE GRAM WEIGHT TESTS OF PARALLEL GROWN TEST PLANTS

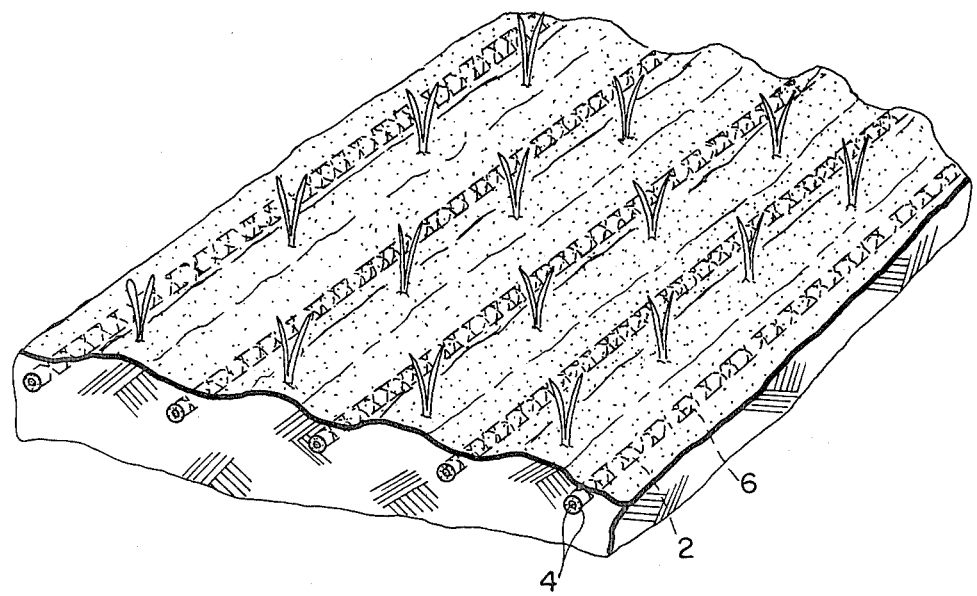
FIG. 5
FIG. 6
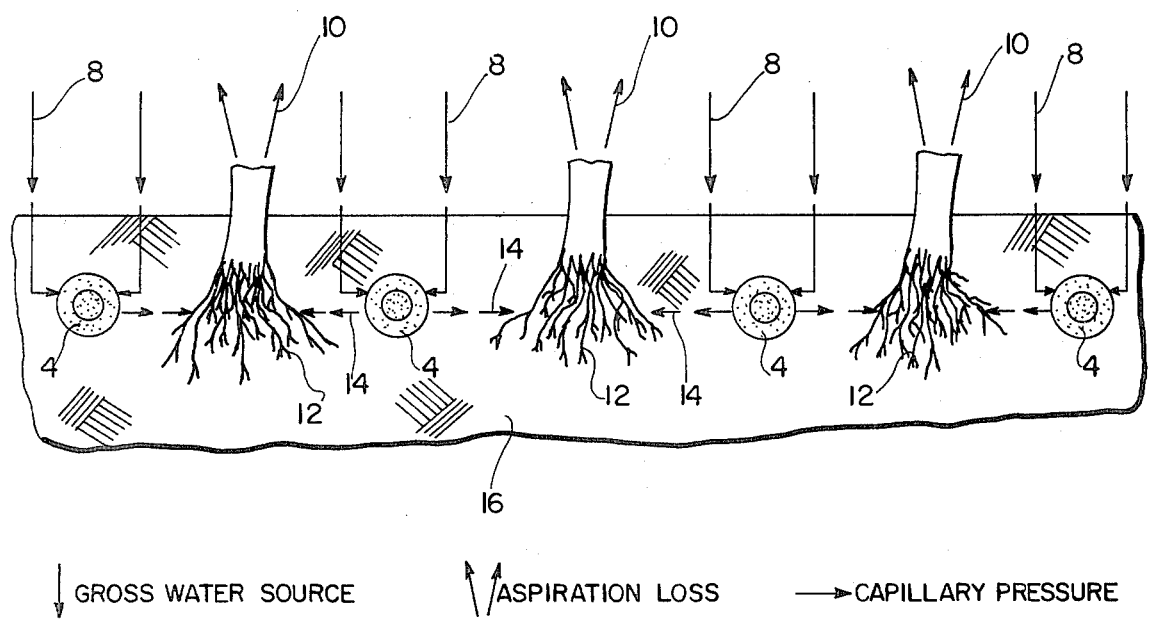
↓ GROSS WATER SOURCE    ↑ ASPIRATION LOSS    → CAPILLARY PRESSURE

OSMOTIC FERTILIZER PRODUCT AND FERTILIZATION METHOD

BACKGROUND OF THE INVENTION

This invention relates to a fertilizer product and method utilizing nitrogen, potassium and phosphorous which are essential elements for plant growth. Fertilizers invariably contain one or more of these elements and those in frequent use at the present time include urea, ammonium nitrate, potassium chloride, sodium nitrate, monoammonium phosphate, potassium sulfate, calcium cyanamide, potassium nitrate, mixtures of calcium acid phosphate and calcium sulfate known as superphosphate, and the like. Urea is a preferred source of nitrogen because of its relatively high nitrogen content in the range of forty-seven percent by volume.

Although in some cases soil analysis shows that only nitrogen fertilizer is required and hence is applied solely, in the majority of cases all three of the aforementioned essential elements are needed. Accordingly the fertilizer actually applied to the soil is a blend of a nitrogen, potassium and phosphorous fertilizers with some compounds such as diammonium phosphate containing more than one essential element. It is conventional to state the amount of essential elements in a complete fertilizer by a series of numbers which refer, in sequential order to the weight percentage of nitrogen as N, phosphorous as $P_2O_5$ and potassium as $K_2O$. For example a 10-10-10 fertilizer contains 10% nitrogen, 10% phosphorous, and 10% potassium by weight. Inert materials are provided with the fertilizer materials to maintain the percentage of the essential elements present in the fertilizer at a relatively low level. This is in an attempt to avoid excessive local concentrations of an essential element in the soil and which may result in a burned root growth.

The readily water soluble property of most fertilizers creates a number of disadvantages steming from the additional need of plants for watering. With watering much of the fertilizer may be dissolved in the water and soaked into the soil below the plant roots thereby never becoming available to the plants. Also there is the possibility that water applied to the plant may result in the disadvantage that the fertilizer becomes available to the plant too rapidly resulting in injury to the plant. This is often seen in burned plants.

The prior art has addressed itself to the aforementioned problem by the use of coatings for granular fertilizers and tableted or shaped forms of fertilizers made from largely water-insoluble components intended to disintegrate and regulate the release of fertilizer materials relatively slowly.

Tableted and coated fertilizers are not able to accomplish the purposes of the present invention. For example many tablets are too rapidly soluble with the result of too rapid leaching of the contained fertilizer particularly for container grown plants. On the other hand slowly soluble non-disintegrating tablets for use with trees, as shown in U.S. Pat. No. 3,024,098 may last a long time, up to two years. However, these tablets or shaped forms do not make a controlled amount of food available at the beginning; nor do they make it available thereafter at a controlled rate as required by container grown plants. This is because the tablets remain hard by not exposing surface areas to solubilization by moisture and bacterial activity. Bacterial activity is essential to the solubility of some of the main ingredients of plant food.

As concerns coated granular fertilizers, the general desire for delayed action by high-analysis fertilizer is well known and the prior art has conventionally addressed itself to this problem by the use of appropriate coatings for granular fertilizers. Granules of fertilizer are frequently non-uniform in composition and contain surface cracks and crevices thereby tending to pulverize readily. Accordingly the prior art has found considerable difficulty in obtaining a uniform and practical coating for granular fertilizers as related to the preparation of granular materials and the application of coatings therefor, the wide variety of uses are almost impossible to contemplate so that a particular coating and granular size is likely to provide undesirable results in some applications.

A further problem exists with presently known methods of supplying fertilizer in that even though a substantial supply of nutrient containing plant food is made available, the plant may not get its benefit. If the source of nutrients is highly soluable it may be leached out before the plant roots draw upon it. Also, there is the possibility that the plant food may revert to an insoluable form if left in the soil too long subjecting it to an excess of moisture and microbial activity. The potassium and phosphate plant foods in particular are susceptible to this conversion. For example, monocalcium phosphate may change to dicalcium phosphate or to aluminum or iron phosphates illustrating a reversion or fixation of phosphate in the soil in a form such that it is not available for the intended plants. As much as eighty percent of these foods may be rendered unavailable.

It is an object of this invention to provide a fertilizer product and a method which releases essential moisture and plant food to a plant without possibility of injury thereto. This is on a systematic basis essentially controlled by the needs of the plant as indicated by the plant itself.

It is an object of this invention to isolate a plant's root system from supplied food nutrients until actually required by the plant, to prevent possibility of plant root system damage from excessive exposure.

It is another object of this invention to make plant food nutrients available in soluble form to a plant at a rate empirically required by the plant, to prevent possibility of plant root system damage from excessive exposure.

It is yet another object of this invention to make plant food nutrients available in soluble form to a plant at a rate empirically related to the plant's needs and its growth rate.

It is a further object of this invention to provide means for systematic plant watering related to a plant's aspiration rate.

It is a further object of this invention to prevent highly water soluble nitrogeneous plant foods from being made unavailable for plant usage by indiscriminate watering.

It is another object of this invention to make plant food compositions of phosphorus and potassium substantially available as soluble forms of plant food.

Other further objects of this invention will become more readily apparent as the disclosed subject matter is more fully understood from the following disclosure.

The invention comprises the achievement of the aforesaid objects by essentially excluding plant food intended for plants from access thereto except by passage through osmotic membranes. These membranes are able to provide the function of osmosis, reverse osmosis, and microporosity cooperatively with forces of capillary pressure as it exists in porous soils in which plants are normally grown.

It is known that it is possible to carry out osmotic exchanges through membranes made of a water swellable microporous paper such as felted cellulose or membranes made of a water swellable polymer such as polyvinyl alcohol. Of course membranes composed of any material providing the osmotic exchange can be used in practicing the subject invention. Heretofore it has not been known to essentially totally exclude plant food from a plant when placed in the soil for release to the plant except by passage through the subject osmotic membranes.

The terminology "osmosis membrane" and "reverse osmosis membrane" has particular significance in pointing out and clearly defining the nature of the material which provides the encasement for the fertilizer materials of this invention. The nature of the material is such that when used as membrane material it is able to provide the function of osmosis in the presence of solute-solvent combinations; it provides the function of reverse osmosis under certain pressure gradient conditions; and provides the aforementioned microporosity necessary to these functions. These are, of course, entirely different functions from mechanically providing perforations in a material to permit liquid to drain through. In fact, the preferred microporosity is that able to effect macromolecular range particle separation from $10^{-4}$ to $10^{-7}$ millimeters.

DETAILED DESCRIPTION OF THE DRAWING

A more complete appreciation of the invention any many of the attendant advantages thereof as relates to the solution of prior art problems will be readily apparent by reference to the following detailed description when considered in connection with the accompanying drawings wherein:

FIG. 1 is a plan view showing a tubular osmosis membrane container seelingly containing a fertilizer product being embedded in the soil of a plant container and encircling the plant.

FIG. 1A is an enlarged fragmentary view of the tubular osmosis fertilizer containing membrane.

FIG. 2 is a schematic and diagrammatic drawing showing the believed physical mechanisms of my invention.

FIG. 5 is a plan view showing the fertilizer product and method as applied to plants in rows.

FIG. 6 is a graphic representation of the determined physics of the elongate product of FIG. 5 as compared to the collarlike product of FIG. 1.

DETAILED DESCRIPTION OF A PREFERRED EMBODIMENT

Figure 3:
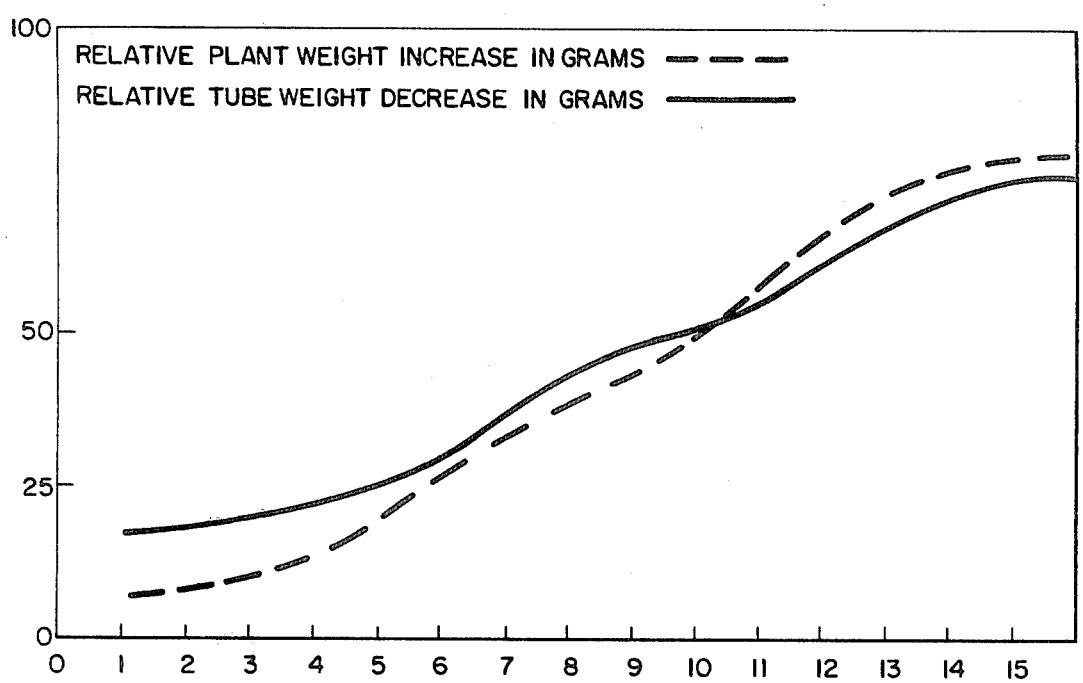
FIG. 3 is a chart indicating plant food concentration in the porous soil surrounding a plant and the determined automatic regulation of the quantity available to an annual plant as regulated by the plant itself with growth from a seedling to a mature plant.

First with reference to FIGS. 1 and 1-A illustrating a preferred form of my invention, it can be seen that in essential terms the fertilizer product, unlike those of the prior art, consists of a tubular osmotic membrane 2 which may consist of one or more layers of cellulosic water-laid tissue 4 constructed and arranged to be of an elongate essentially flexible tubular form. The tubular form permits placement of the fertilizer product around and spaced outwardly from a potted annular or perennial plant as shown in FIG. 1. The ends of the tubular member 2 can be sealed by dipping into a parafin base wax to form a coating 5. Of course the end coating 5 can be of any suitable material. I prefer that the granular fertilizer contents 7 be tightly packed within the cellulosic membrane defining the osmotic tube. Because of the relatively fragile nature of the one or more layers of swellable unbleached cellulose tissue or wadding used in providing an osmotic membrane barrier between the plant and the fertilizer materials it is desirable to reinforce the membrane. One method of accomplishing this is by use of spaced apart spiral wrappings of Nylon yarn braiding 6 applied for example, by means of a standard braiding machine. The braiding 6 may be sized or caused to adhere to the exterior surface of the tube by adhesives of a water swellable nature such a polyvinyl acetate and the like. The preferred fertilizer materials 7 contained within the tubular osmotic membrane 2 described above are those of a high analysis type containing one or more of the essential elements nitrogen, phosphorous, and potassium and which may have been coated as is known in the art. This is to aid in retarding their dissolution rate and to provide other desirable properties such as prevention of cracking and caking. It is preferred to use a soybean base material coating while practicing my invention. Further preferred fertilizer materials are those prepared with a plurality of coatings of cured copolymers of dicylopentadiene and a glycerol ester of an unsaturated acid. These are shown in U.S. Pat. No. 3,223,518 although other fertilizer materials and combinations thereof with minerals, soil additives and the like may be utilized.

If desired, the fertilizer product may be made as a lengthy continuous tubular structure with the granular plant food product and other desired additives packed therein. The packing can be accomplished by use of a conventional vibrator to a desired compaction. The tubular fertilizer product may then be cut into suitable lengths permitting positioning horizontally around a potted plant at a predetermined space from and slightly beneath the surface of soil as shown in FIG. 1. By tightly packing the granular materials as discussed above, and particularly when coated, it has been found unnecessary to sealingly coat the osmotic tube ends when cut. However this end sealing with coating 5 is considered desirable in positively avoiding the presentation of plant food to a plant on an accidental basis rather than the controlled, systematic basis. The tube ends may be sealed by dipping them into one of a number of suitable film forming compositions such as paraffin base wax forming the end sealing coat 5 as shown in FIG. 1A.

With reference to FIG. 2, it can be seen that watering the plant from above as is diagrammatically shown by line 8 as is conventionally practiced with pot grown plants, results in the water being directed to preferentially penetrate the cellulosic reverse osmosis membrane 4. This takes place because of the greater tendency of water molecules to push water through a membrane into a solution by the process known as osmosis. Such pressure can be substantial. By way of illustration such pressure is known as the essential reason for the elevation of sap from the root system to the tops of trees; also, to be an essential characteristic of plant growth.

The solubilized plant food contained within the reverseosmotic barrier made from cellulose is restrained therein but is reduced to a solubilized salt or solubilized salts. The arrows 10 indicate the continued release of moisture to atmosphere which is a portion of what was collected by the plant root system 12. The released portion is in addition to the moisture utilized in plant cell development received by the plant through root system 12. It is readily apparent that the soil body 16 located between the periphery of the reverse-osmotic membrane 4 surrounding and spaced apart from plant root system 12 necessarily is a relatively porous body subject to all of the complex phenomenon of fluid flow through such porous bodies. This includes flow attributable to capillary action and related capillary pressure as represented by arrows 14. The moisture removal from the soil surrounding the plant at a rate regulated by the plant's growth and needs for moisture results in a diminished moisture concentration gradient in the soil in the direction of the plant. Accordingly the solubilized plant foods within tube 4 move as ions under pressure toward the plant because of the pressure differential caused by water removal as shown.

Under capillary pressure, transport of both food and moisture to the plant is rapid. This is without exposure to large amounts of water causing leaching or permitting undue exposure to soil contact which exposure causes fixation. Accordingly the work of reverse osmosis conducting moisture and ionized nutrients to the plant, on the basis of need regulated by the plant, is done against osmosis. While I do not wish to be strictly bound by principles only generally set forth for the sake of clarity in describing my invention, it is considered that in essential terms the principles described are those which represent the mechanisms which attain the objects of my invention as set forth above. To further explain, the water swellable membranes are not just osmotic barriers; but are osmotic regulators controlling in fact the flow rate and quantity of moisture and ionized plant food to a plant as required. It is not represented that such osmotic regulation as that shown is as precise as that stemming from membrane regulation between tissues and the blood stream of the human body. However it is considered that a roughly similar and analogous mechanism has been attained.

With reference to FIG. 3 multiple determinations were made relative to decrease in weight of fertilizer and moisture containing reverse-osmosis tubular structures as provided by my invention. Such decreases were plotted against weight increases of potted plants grown for such control and test purposes, the plants being those grown from seed or seedlings. It is noted that the relatively small weight decrease of the fertilizer product approximately corresponds to the relatively low weight of plants small in size in their early growing period. Also, that such decrease in weight accelerates with increase in plant size providing indication for concluding that osmotic regulation does exist to the extent projected above.

Figure 4:
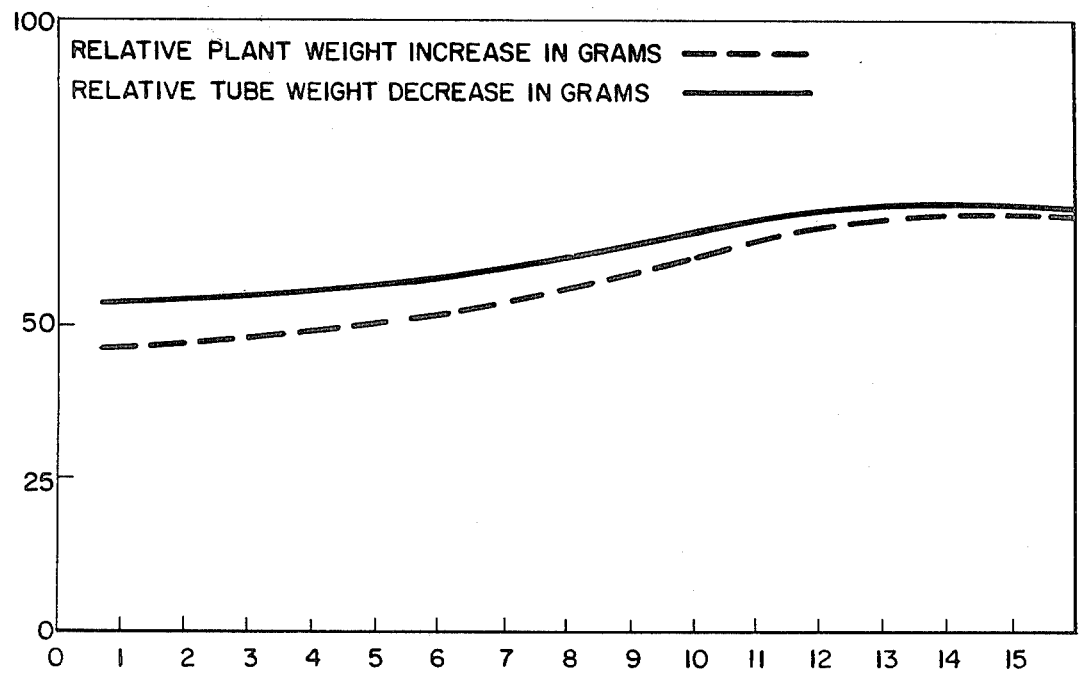
FIG. 4 is a chart showing similarly, by test weight measurements, the regulation of plant food concentration which by the means of the subject invention a plant of perennial constant size makes available to itself.

As concerns FIG. 4 similar determinations were made but with the difference that the plants weighed over an extended growing season were of a perennial nature essentially undergoing cell replenishment with changes in size and weight that were not as great as the plants of FIG. 3. Again the decrease in weight of fertilizer and moisture content finds parallel with the test plants weight. As concerns both the test plants of FIGS. 3 and 4 in no instances were color deficiencies or any other signals of deterioration noted indicating a harmful release of fertilizer to the plant system.

With reference to FIG. 5, as is readily apparent, the disclosed fertilizer product and method is readily adapted to multiple plants arranged in rows as shown. The fertilizer product 2 is precisely the same as that of FIG. 1 except that it is used in longer lengths.

FIG. 6 shows, similar to FIG. 2, the osmotic regulatory mechanism as it appears to function relative to my invention. The osmotic regulatory system described is essentially as set forth concerning FIG. 2. It is readily apparent that the osmotic regulatory system has utility in shape forms other than those described and which are preferred.

From the foregoing description of my invention in its preferred form it will be apparent that the same is thus subject to alteration and modification without departing from the underlying principles involved. I do not desire to be limited in my protection to the specific details illustrated and described except as may be necessitated by the appended claims:

What is claimed is:

1. A fertilizer product comprising an imperforate reverse osmosis tubular membrane member composed of polyvinyl alcohol; a fertilizer material containing (consisting of) at least one member of the group consisting of (comprising) nitrogen, phosphorous and potassium; said tubular member containing an evenly distributed predetermined quantity of said fertilizer material; and said fertilizer material being released through said tubular member in proportion to the requirements of plant growth.

2. The fertilizer product of claim 1 where said tubular member is reinforced on its outer surface by filamentary yarn wrapped about the permeable membrane member.

3. A fertilizer product comprising an imperforate reverse osmosis member characterized by osmotic separation usefulness in the ionic and macromolecular range particle size separation from $10^{-4}$ to $10^{-7}$ millimeters and made from a water swellable polymer, said member sealingly enclosing granulated plant fertilizer materials containing (consisting of) at least one member of the group consisting of (comprising) nitrogen, phosphorous and potassium.

4. Method of applying plant food to growing plants comprising the steps of: sealingly enclosing granulated plant food fertilizer containing (consisting of) at least one member of the group consisting of (containing) nitrogen, phosphorous and potassium within an essentially imperforate reverse osmosis member made from a water-swellable polymer and characterized by osmotic separation usefulness in the ionic and macromolecular range particle size separation from $10^{-4}$ to $10^{-7}$ millimeters; positioning and arranging said sealingly enclosed plant food in an upper layer of porous soil adjacent to but spaced apart from a growing plant with the plant food separated from the plant by said reverse osmosis member: and watering the porous soil in the area of the sealingly enclosed plant food whereby osmotic forces direct the water through the member wall solubilizing plant food enclosed therein and pressure differential between the interior of the membrane enclosure and the porous soil at the exterior thereof resulting from capillary pressure by virtue of moisture removal from the soil (sail) by the plant causing reverse osmosis transfer of said solubilized plant food through the membrane wall with capillary pressure transport to the plant.

5. A method of making a fertilizing product comprising the steps of: wrapping an imperforate water-swellable polymer sheet membrane material into a tubular form; filling said tubular member with a predetermined quantity of a fertilizer material containing at least one member of the group consisting of nitrogen, phosphorous and potassium; and coating the ends of said tubular member with a paraffin base wax.

6. A method of making a fertilizing product as described in claim 5 further comprising the step of wrapping a filamentary yarn braid around the outer surface of said tubular member thereby reinforcing said tubular means.

* * * * *